Feb. 21, 1967  W. D. BRUNIG  3,304,929
COOKING GRILL
Filed April 8, 1965  2 Sheets-Sheet 2
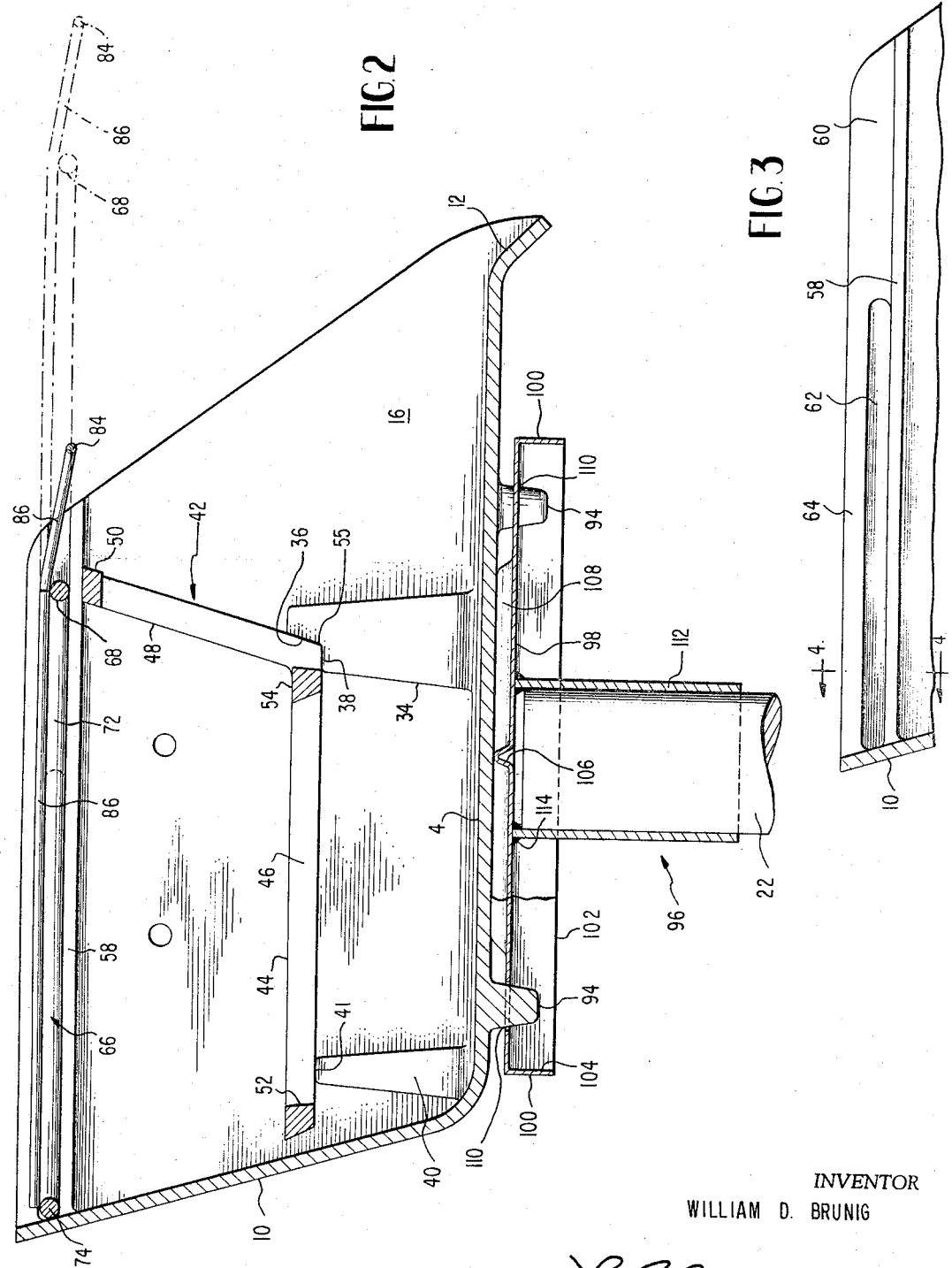
INVENTOR
WILLIAM D. BRUNIG
BY LeBlanc & Shur
ATTORNEYS

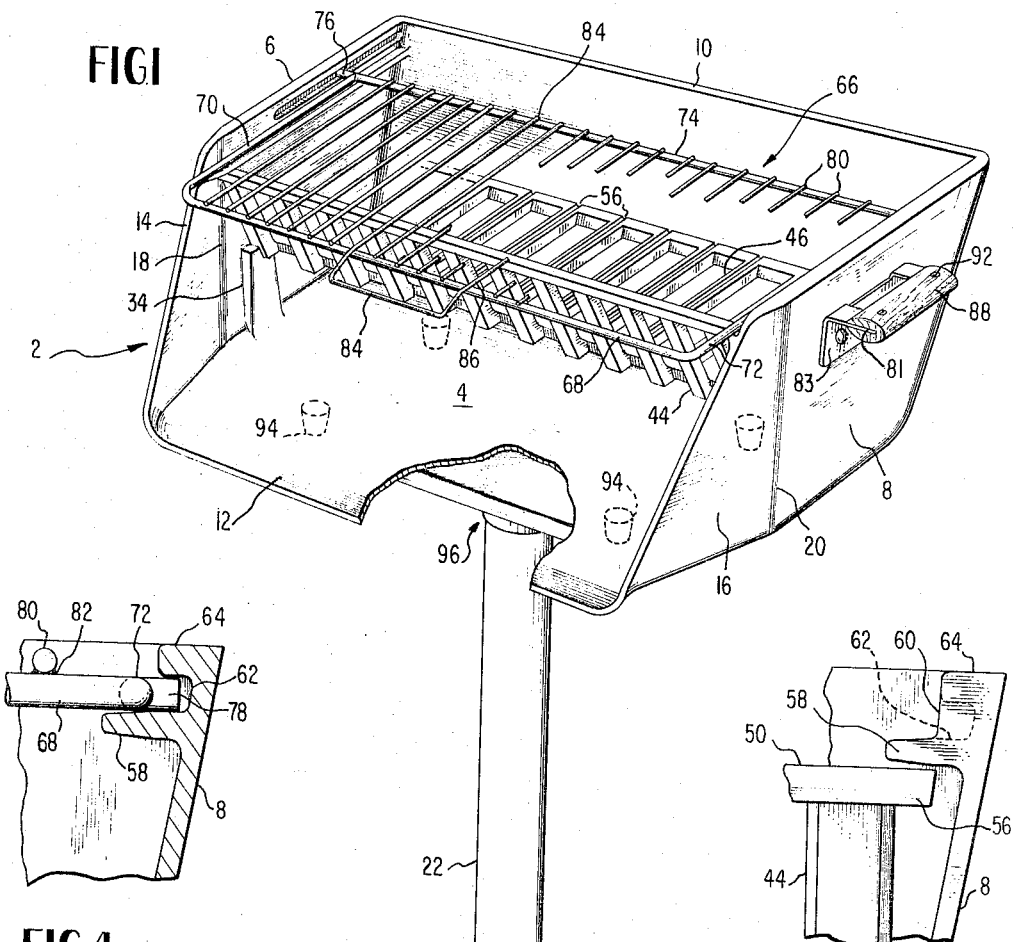
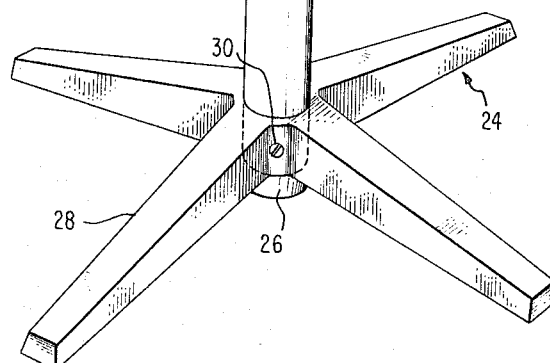

United States Patent Office 3,304,929
Patented Feb. 21, 1967

3,304,929
COOKING GRILL
William D. Brunig, Norwich, N.Y., assignor to Bennett-Ireland Inc., Norwich, N.Y.
Filed Apr. 8, 1965, Ser. No. 446,642
13 Claims. (Cl. 126—25)

This invention relates to cooking grills, and more particularly to portable cooking grills.

In recent years, cooking grills of a wide variety have achieved considerable popularity for outdoor cooking and barbecuing in the backyard, on picnics and on camping trips, and also, in a lesser number of instances, for use indoors in fireplaces. Generally speaking, the grills which have been previously provided have been particularly adapted for one or the other of the foregoing purposes and generally were not adapted to be conveniently used for all purposes.

So far as is known, all of the previously available grills have been subject to one or more of the following deficiencies: bulky, cumbersome construction making handling and portability difficult; a multiplicity of parts connected together by rivets, bolts, or the like, whereby continued usage causes erosion of the fastening means to thereafter prevent disassembly of the parts and also gradually reduce the rotatability of joints intended to be pivotable; an over-multiplicity of parts, with the attendant tendency for some parts to ultimately become lost; the use of interfitting wire parts formed in such a manner as to be susceptible to damage through bending; poor drafts; difficulty in adding fuel once the fire has been started; lack of provision for regulating the draft; lack of provision for, or inconvenient or ineffective provision for, varying the heat of cooking; danger of hot coals falling out of the unit; and complicated interfitting of parts for assembly of the unit. Still other disadvantages and difficulties are encountered with other specific units.

According to the present invention, there is provided a portable cooking grill adapted for ready use (1) as a picnic or backyard grill, either on a readily portable stand or without the stand on a table or other support; and (2) as an indoor grill in a fireplace. The unit, exclusive of the stand, comprises merely three sturdy interfitting and readily mountable and demountable parts which are not fastened together by rivets, bolts, or other fastening means subject to deterioration on usage. These three parts—namely, the body, the grate, and the grill—are readily assembled in simple fashion, in a manner which makes inadvertent disassembly during usage practically impossible. At the same time, the unit is so constructed as to provide for convenient and rapid initial filling with fuel, maintenance of the fuel supply, and assurance against accidental escape of live coals. The arrangement is such that the heat used in cooking may be very simply regulated without the necessity of raising or lowering the grill and without the necessity of resorting to screw-type arrangements which tend to erode in use and ultimately become locked in one position. The body of the unit is shaped in such a manner as to control the draft and, according to one embodiment, a stand is provided to permit convenient mounting in such a manner that the unit may be turned into or out of the wind to secure accurate draft control. The body and stand are arranged in such a manner as to permit rapid mounting and demounting on the stand even after the unit is in use and hot.

It is accordingly a primary object of the present invention to provide an improved portable cooking grill useful not only outdoors on a stand or table but also indoors in a fireplace.

It is another object of the invention to provide a portable cooking grill of the foregoing type possessed of a minimum number of sturdy parts adapted for simple and rapid assembly and disassembly without the use of connectors such as threads, rivets, or the like.

It is another object of the invention to provide a portable cooking grill of the foregoing type which permits convenient and accurate control of the cooking heat, ready access to the fire for addition of fuel, and protection against the accidental discharge of hot coals.

It is still another object of the invention to provide an improved portable cooking grill of the foregoing type wherein the body, grate, and grill portions are intended for complete assembly and disassembly by the user without the use of tools or fixedly pivoted joints necessitating hand labor in manufacture of the unit. As a result, the grill of the invention is low in cost while at the same time possessing the aforementioned advantages not previously provided by available units.

It is a still further object of the invention to provide an improved portable cooking grill so constructed as to overcome the aforementioned disadvantages of previously available units.

These and further objects and advantages of the invention will become more apparent upon reference to the following specification and claims and appended drawings, wherein:

FIGURE 1 is a perspective view of the cooking grill of this invention showing the grill unit mounted on a stand for use as a picnic grill or in the back yard;

FIGURE 2 is a vertical section of the grill of FIGURE 1 taken along the centerline of the stand;

FIGURE 3 is a partial side elevation showing the flange and groove arrangement for securing the grill and grate in position;

FIGURE 4 is a partial vertical section taken along the line 4—4 of FIGURE 3 and showing the grill in position in the slot and flange arrangement; and FIGURE 5 is a partial front elevation of the same slot and flange arrangement, showing the interrelationship with the grate.

Referring to FIGURE 1, the cooking grill of the invention comprises a body, generally indicated at 2, which is preferably formed of cast iron. The body 2 is comprised of a generally horizontal floor 4, slightly outwardly inclined side walls 6 and 8, a backwardly inclined back wall 10, the side and back walls being attached to the bottom wall by curvate sections. The bottom wall 4 has at its front edge a downwardly curved front lip 12 connected to diagonal wall extensions 14 and 16 which extend from the forward edges 18 and 20 of the side walls 6 and 8. The body 2 is supported, in a manner presently to be described, on a post 22 which may be formed of a steel tube. The lower end of the steel tube 22 is supported by a pedestal-type base, generally indicated at 24 and having a central hub portion 26 from which a series of legs 28 radiate. A set-screw 30 may be used to secure the post 22 to the base 24. Alternatively, this screw may be dispensed with and the post 22 received on a bottom in the hub 26. The base 24 is preferably formed of cast iron cast in a hollow shape, as indicated by the broken lines at 32. This greatly reduces the weight of the base and provides for more convenient portability.

As may be seen in FIGURES 1 and 2, each of the side walls 6 and 8 is provided with an internal integral forward flange 34 whose upper surface is notched to provide a rearwardly facing, generally vertical disposed face 36 and an upwardly facing, generally horizontal face 38. Each side wall 6 and 8 is also provided with an inner integral upstanding flange 40 having an upwardly facing surface 41.

The grate, which is generally indicated at 42, is generally L-shaped in cross-section and is comprised of a series of L-shaped spindles 44 having horizontal portions 46 and outwardly inclined, upstanding portions 48. As is best seen in FIGURE 2, the spindles 46 are secured together by parallel front and rear spacer bars 50 and 52, respectively, and an intermediate spacer bar 54 disposed near the bend 55 in the spindles. The upper spacer bar 50 extends beyond the outermost spindles 44, as is seen at 56 in FIGURE 5. The grate is preferably formed of cast iron and the upper surfaces of the spindles are preferably provided with grooves 56 which increase the draft beneath coals held on the grate. (Best seen in FIGURE 1.)

Each of the side walls 6 and 8 is provided at its upper edge with an inwardly extending lower flange 58 and boss 60. The boss 60 is slotted at 62 to define an upper flange 64.

Referring now to FIGURES 1, 2, and 5, the grate 42 is inserted into the body (the grill being removed at the time) by moving it generally horizontally inward with the rear spacer-bar 52 raised above its normal position so as to lower the front spacer-bar 54 and associated bent portions of the spindles 44 to clear the forward flanges 34 while the upper spacer-bars 50 at the same time clear the lower surface of the lower flange 50. The grate is then rotated counterclockwise to seat the outermost side spindles 44 on the upper surface 41 of the rear flange 40 and to seat the bent portion 55 on the surfaces 36 and 38 of the forward flanges 34. When in this position, the extended edges 56 of the upper-spacer bar 50 lock under the flange 56, as seen in FIGURES 2 and 5. With the unit assembled in this position, it will be obvious that the grate can move neither forward nor backward nor upward and is thus fastened securely in position by the simplest of mounting procedures. Demounting is the simple inverse of the mounting procedure. When the grate is in position as shown in FIGURES 1 and 2, the coals are securely contained on all four sides by the spindles 48, rear wall 10, and side walls 6 and 8, thereby safeguarding against any accidental discharge of coals.

The unit is provided with a grill, generally indicated at 66 in FIGURES 1 and 2. The grill 66 is preferably formed of steel wire with a bright chrome finish. An outer frame is provided by a heavy steel wire having a front member 68 and side members 70 and 72 bent from the front member so as to be substantially perpendicular thereto. A back member 74 is welded to the rear end of side members 70 and 72 and extends therebeyond, as shown at 76 in FIGURE 1 and 78 in FIGURE 4. A series of smaller-gauge wires 80 are disposed in parallel fashion and welded to the front and back members 68 and 80, as illustrated at 82 in FIGURE 4. Two of these wires 84 and 86 constitute a generally U-shaped member with the bight thereof extending beyond the front member 68, as shown at 84 in FIGURE 2. The forwardmost portion of the bight is slightly downwardly bent, as shown at 86 in FIGURE 2.

The grill 66 is inserted into the body of the unit by cocking the back 74 diagonally and then rotating it into a position parallel with the back wall 10 whereby the frame ends 76 and 78, which extend beyond the side members 70 and 72, enter the slots 62. Once in this position, the grill is interlocked with the body. The side members 70 and 72 rest upon and are supported by the inwardly extending flanges 58 which are integral with the side walls 6 and 8. The grill 66 is then slidable forward and back to both permit accurate and infinitely variable adjustment of the cooking heat and also to permit pulling the grill forward for the addition of fuel when the unit is in use. It will be noted that the arrangement is such that even though the grill is pulled all the way forward, as illustrated by the broken lines in FIGURE 2, there is no danger of its tipping downwardly clockwise in FIGURE 2, because of the arrangement of ends 76 and 78 in slots 62 and because of flange 58. That is to say, the side members 70 and 72 are supported on the flanges 58 forward of the forwardmost ends of the slots 62, whereby the upper flange 64 prevents clockwise rotational motion which might permit spilling of the food.

When the fire is first being started, the grill 66 may be slid to its rearmost position and rotated in a clockwise direction so as to be out of the way and permit easy introduction of fuel and proper arrangement of the fuel bed. The grill will hold itself in such an upraised position, due to the inclined disposition of the back 10 and arrangement of wire ends 76 and 78 in slots 62.

A pair of wooden side handles 81 are mounted on side walls 6 and 8 by means of metal brackets 83.

The bottom 4 of the body 2 is provided with four downwardly extending feet 94 which may be used to support the cooking grill on a table, in a fireplace, or on any other generally flat surface. In addition to this, the feet 94 are adapted to be received within a fixture, generally indicated at 96, which mounts upon the top end of the post 22, as is best seen in FIGURE 2. The fixture 96 comprises a rectangular plate 98 having downwardly extending, peripheral flanges 100 and 102 which are welded at their corners 104. The plate may be formed of any suitable material, such as 14-gauge mild steel. A pair of X-disposed ribs 106 and 108 are upwardly embossed across the center of the plate for strengthening purposes and to serve as a support. Four holes 110 are provided in plate 98 to receive the feet 94 of the bottom of the cooking grill. The holes 110 are larger than the feet 94 so that the grill is supported by the upwardly embossed ribs 106 and 108, as is clearly seen in FIGURE 2. The plate 98 is itself supported on a short section of tube 112 which may be formed of steel and welded to the undersurface of the plate as at 114.

It will be apparent that the cooking grill is assembled with the stand by simply seating the feet 94 in the holes 110 and is just as easily removable in the converse manner. Once in position, its own weight and the interlocking relationship of the feet and holes in the plate 98 prevent any inadvertent displacement of the unit. For convenience in carrying, such as in the trunk of an automobile, the plate 98 is easily lifted from the upper end of the tube 22 and the post or tube 22 is easily removed from the base 28. The separate units are then easily transported in the trunk of an automobile.

When in position on the stand, the fixture 96 is rotatable about the upstanding post 22 so that by rotating the unit, and particularly the air scoop 12 at the forward end, the fire may be turned into or out of the prevailing wind for accurate adjustment of the draft. This effect is emphasized by the generally streamlined nature of the body with its backwardly inclined back wall 10 curvately joined to the flat bottom wall 4. The same is true of the outward inclination and curvate joinder of the side walls 6 and 8.

In use, the unit is assembled by dropping the post 22 into the base 28. It may be locked in this position by means of the set-screw 30, if desired, but this is not necessary where the receptacle in the base is provided with a bottom, the weight of the unit holding the post in position. The fixture 96 is thereupon inserted over the top end of the post and the cooking grill mounted thereon by inserting the feet 94 into the holes 110. The grate 42 is next inserted by sliding it in in a slightly clockwise cocked position, as seen in FIGURE 2, so that the upper spacer-bars 50 clear the undersurface of the flange 58 while the edge 55 clears the uppermost surface of the forward flange 34. Once beyond this point, the grate is rotated slightly counterclockwise so as to interfit with the flange 34 and 40 and thereby be secured in position, as shown in FIGURE 2. The grill is then inserted by cocking the back member 74 relative to the back wall 10 and then rotating the back members to a substantially parallel position, as shown in FIGURE 1, whereupon the ends 76 and 78 thereof are received in the slots 62.

The grill 66 may be rotated counterclockwise in FIGURE 2 at the rear of the slots 62 so as to provide full access to the fuel space formed by the grate 42 and back and side walls of the grill body. The fire may be started, the grill moved to its normal cooking position as shown by the solid lines in FIGURE 2, and the unit rotated for best disposition relative to the prevailing winds. The heat of cooking may be regulated by moving the grill to the right, as illustrated by the broken lines in FIGURE 2. The extreme rightward position thus illustrated also permits the introduction of additional fuel as the fire burns. The unit may be disassembled by the converse of the foregoing steps.

It will be apparent from the foregoing that the portable cooking grill of this invention is sturdy and simple in construction and susceptible of assembly in an uncomplicated fashion which makes inadvertent disassembly practically impossible. The unit is adapted for ready use as a picnic or backyard grill, either on a readily portable stand or without the stand on a table or other support, and also is equally adapted to use as an indoor grill in a fireplace. Solid fuel is readily introduced prior to starting of the fire and equally conveniently supplemented during use of the unit. Construction is such that the accidental escape of live coals is virtually impossible. The heat used in cooking may be very simply regulated without the necessity of raising or lowering the grill and the draft controlled by simply rotating the unit into or out of the prevailing winds.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A portable cooking grill comprising a body having solid bottom, side and back walls with an open top and front, a grate of generally L-shaped cross-section insertable therein, said grate having a floor and an upstanding front wall located at the front of said body for containing solid fuel, and a grill insertable into said body and interfitting therewith to permit both sliding and pivotal movement of said grill, the bottom wall of said body including a curved lip at said open front forming an air scoop for directing air into said body.

2. A portable cooking grill as set out in claim 1 wherein said grate is supported on flanges attached to the inner surfaces of said side walls and having first surfaces facing upwardly and second surfaces facing rearwardly toward said back wall.

3. A portable cooking grill as set out in claim 1 wherein said grill comprises an outer frame having generally parallel side members and a back member attached to said side members and extending there beyond, flanges on the inner surfaces of said side walls, said side members being supported on said flanges, and slots in said side walls, said extensions of said back member extending into said slots to provide slidable and pivotal mounting of said grill.

4. A portable cooking grill as set out in claim 2 wherein said grill comprises an outer frame having generally parallel side members and a back member attached to said side members and extending therebeyond, flanges on the inner surfaces of said side walls, said side members being supported on said flanges, and slots in said side walls, said extensions of said back member extending into said slots to provide slidable and pivotal mounting of said grill.

5. A portable cooking grill as set out in claim 1 wherein said grill comprises an outer frame having a front member and generally parallel side members and a back member attached to said side members and extending therebeyond, a first pair of flanges extending inwardly towards one another from the inner surfaces of said side walls, said flanges being disposed generally horizontally, a pair of bosses extending inwardly towards one another from the inner surfaces of said side walls immediately above said first pair of flanges, and a pair of slots in said bosses immediately above said first pair of flanges, said side members of said grill being supported on said first pair of flanges and said extensions of said back member extending into said slots.

6. A portable cooking grill comprising a body having bottom, side and back walls, a grate of generally L-shaped cross-section insertable therein, said grate having a floor and an upstanding front wall for containing solid fuel, a grill insertable into said body and interfitting therewith, a demountable stand for supporting said cooking grill, said stand having a base at the bottom thereof, a post mounted in said base, and a mounting fixture rotatably mounted on the upper end of said post, foot means depending from the bottom wall of said cooking grill body and engageable with a plate carried by said fixture to secure said body in position on said stand.

7. A portable cooking grill as set out in claim 6 wherein said fixture comprises a cylindrical member fastened to the underside of said plate and said plate is provided with apertures for receiving said foot means on said body, said cylindrical member being rotatably mounted on said post.

8. A portable cooking grill comprising a body having bottom, side and back walls, a grate insertable therein, said grate comprising a series of generally L-shaped spindles fastened together by spacer members attached to said spindles at their extremities and at the point of bend in the "L" so that said grate forms a floor and an upstanding front wall, flange means extending inwardly from the inner surface of the sidewalls of said body, said flange means including upwardly facing surfaces and rearwardly facing surfaces so that when said grate is mounted in engagement with said surfaces it is supported above the bottom of said body and is prevented from moving forward by said rearwardly facing surfaces, a grill insertable into said body and interfitting therewith, and including further inwardly extending flanges on the inner surfaces of said side walls, said flanges abutting the uppermost spacer-bars at the upper edge of the front wall of said grate, said grill comprising an outer frame having generally parallel side members and a back member attached to said side members and extending therebeyond, said side members being supported on said further flanges, slots in said side walls, said extensions of said back member extending into aid slots to provide slidable and pivotal mounting of said grill.

9. A portable cooking grill comprising a body having bottom, side and back walls, a grate of generally L-shaped cross-section insertable therein, said grate having a floor and an upstanding front wall for containing solid fuel, a grill insertable into said body and interfitting therewith to permit both sliding and pivotal movement of said grill, said grate being supported on flanges attached to the inner surfaces of said sidewalls and having first surfaces facing upwardly and second surfaces facing rearwardly toward said back wall, said grill comprising an outer frame having generally parallel side members and a back member attached to said side members and extending therebeyond, flanges on the inner surfaces of said sidewall, said side members being supported on said flanges, and slots in said side walls, said extensions of said back member extending into said slots to provide slidable and pivotal mounting of said grill, said front wall of said grate having outwardly extending portions locking beneath said flanges on the inner surfaces of said sidewalls.

10. A portable cooking grill as set out in claim 9 wherein said grate comprises a series of generally L-shaped spindles secured together by rear, upper and intermediate spacer-bars, said outwardly extending portions of said grate being extensions of said upper spacer-bar.

11. A portable cooking grill as set out in claim 10 wherein said outer frame of said grill is wire and supports spaced parallel wire members between said side members, said wire members being attached to said back member and to a front portion of said frame member connecting said side members, and handle means attached to said front portion for slidable and rotationally moving said grill.

12. A portable cooking grill comprising a body having bottom, side and back walls, a grate of generally L-shaped cross-section insertable therein, said grate having a floor and an upstanding front wall for containing solid fuel, a grill insertable into said body and interfitting therewith to permit both sliding and pivotal movement of said grill, said grill comprising an outer frame having a front member and generally parallel side members and a back member attached to said side members and extending therebeyond, a first pair of flanges extending inwardly towards one another from the inner surfaces of said sidewalls, said flanges being disposed generally horizontally, a pair of bosses extending inwardly towards one another from the inner surfaces of said sidewalls immediately above the first pair of flanges, said side members of said grill being supported on said first pair of flanges and said extensions of said back member extending into said slots, said front wall of said grate having outwardly extending portions locking beneath said first pair of flanges.

13. A portable cooking grill as set out in claim 12 wherein said grate comprises a series of generally L-shaped spindles secured together by rear, upper and intermediate spacer-bars, said outwardly extending portions of said grate being extensions of said upper spacer-bar.

References Cited by the Examiner

UNITED STATES PATENTS

| | | | |
|---|---|---|---|
| 837,745 | 12/1906 | Smith et al. | 126—164 |
| 1,438,345 | 12/1922 | Tait et al. | 126—9 |
| 2,575,082 | 11/1951 | Wolff | 126—25 |
| 2,885,950 | 5/1959 | Stoll et al. | 126—25 |
| 3,176,676 | 4/1965 | Caldwell | 126—25 |
| 3,179,104 | 4/1965 | Chapman et al. | 126—9 |

FREDERICK L. MATTESON, JR., *Primary Examiner.*

E. G. FAVORS, *Assistant Examiner.*